United States Patent
Monacchio et al.

(10) Patent No.: US 10,179,661 B2
(45) Date of Patent: Jan. 15, 2019

(54) GROUND CONNECT DUCT FOR ENVIRONMENTAL CONTROL SYSTEMS

(71) Applicant: HAMILTON SUNDSTRAND CORPORATION, Windsor Locks, CT (US)

(72) Inventors: John D. Monacchio, Windsor Locks, CT (US); Clarence J. Wytas, Stafford Springs, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 499 days.

(21) Appl. No.: 14/950,124

(22) Filed: Nov. 24, 2015

(65) Prior Publication Data
US 2017/0144777 A1 May 25, 2017

(51) Int. Cl.
*F16L 23/026* (2006.01)
*B64F 1/36* (2017.01)
*F16L 23/032* (2006.01)

(52) U.S. Cl.
CPC ............ *B64F 1/364* (2013.01); *F16L 23/026* (2013.01); *F16L 23/032* (2013.01)

(58) Field of Classification Search
CPC ..... F16L 43/001; F16L 23/023; F16L 23/032; F16L 23/04; B64F 1/364; B64F 1/364
USPC ........................................................ 285/179
See application file for complete search history.

(56) References Cited

U.S. PATENT DOCUMENTS

| | | | | |
|---|---|---|---|---|
| 1,412,055 A | * | 4/1922 | Hartog | F01P 11/04 285/179 |
| 4,653,777 A | * | 3/1987 | Kawatsu | F16L 43/001 285/179 |
| 4,702,274 A | * | 10/1987 | Kramer | E03F 3/04 285/179 |
| 4,986,732 A | * | 1/1991 | Stock | F01D 13/02 285/179 |
| 5,188,396 A | * | 2/1993 | Calvin | F16L 57/06 285/179 |
| 5,718,461 A | * | 2/1998 | Esser | F16L 43/001 285/179 |
| 6,494,234 B2 | * | 12/2002 | Esser | F16L 43/001 285/179 |
| 7,699,355 B2 | * | 4/2010 | Vitel | F16L 23/032 285/179 |
| 2009/0107160 A1 | * | 4/2009 | Montminy | B64F 1/364 62/239 |

FOREIGN PATENT DOCUMENTS

| | | | | |
|---|---|---|---|---|
| DE | 3800731 C1 | * | 8/1989 | ............ F16L 43/001 |
| DE | 102010014923 A1 | * | 12/2011 | ............ F16L 23/04 |

* cited by examiner

Primary Examiner — David Bochna
(74) Attorney, Agent, or Firm — Cantor Colburn LLP

(57) ABSTRACT

A ground connect duct includes a ground connect flange with an inner diameter and an outer diameter, wherein the inner diameter is between 7.000 inches and 9.000 inches and the outer diameter is between 9.000 inches and 11.000 inches, a V-band flange, and a duct body with the inner diameter, wherein the duct body is coupled to the ground connect flange and the V-band flange to have an overall length between 6.261 inches and 8.261 inches and to dispose the V-band flange at an angle between 6.000 degrees and 8.000 degrees relative to the ground connect flange.

18 Claims, 3 Drawing Sheets

GROUND CONNECT DUCT FOR ENVIRONMENTAL CONTROL SYSTEMS

BACKGROUND

The subject matter disclosed herein relates to environmental control systems and more particularly, to a ground connect duct for an environmental control system for an aircraft.

Typically, an environmental control system provides heated and conditioned air into the flight deck and cabin of an aircraft. During certain operating conditions, such as when an aircraft is on the ground and parked, the environmental control system of the aircraft does not supply air, requiring the use of a ground cart to supply heated and conditioned air into the flight deck and cabin of the aircraft. The use of a ground connect duct to facilitate the airflow of the ground cart into the flight deck and cabin via environmental control system is desired.

BRIEF SUMMARY

According to an embodiment, a ground connect duct includes a ground connect flange with an inner diameter and an outer diameter, wherein the inner diameter is between 7.000 inches and 9.000 inches and the outer diameter is between 9.000 inches and 11.000 inches, a V-band flange, and a duct body with the inner diameter, wherein the duct body is coupled to the ground connect flange and the V-band flange to have an overall length between 6.261 inches and 8.261 inches and to dispose the V-band flange at an angle between 6.000 degrees and 8.000 degrees relative to the ground connect flange.

According to an embodiment, an environmental control system includes an environmental control system module, and a ground connect duct to facilitate airflow from a ground source to the environmental control system module, including a ground connect flange with an inner diameter and an outer diameter, wherein the inner diameter is between 7.000 inches and 9.000 inches and the outer diameter is between 9.000 inches and 11.000 inches, a V-band flange, and a duct body with the inner diameter, wherein the duct body is coupled to the ground connect flange and the V-band flange to have an overall length between 6.261 inches and 8.261 inches and to dispose the V-band flange at an angle between 6.000 degrees and 8.000 degrees relative to the ground connect flange.

Technical function of the embodiments described above includes a ground connect flange with an inner diameter and an outer diameter, wherein the inner diameter is between 7.000 inches and 9.000 inches and the outer diameter is between 9.000 inches and 11.000 inches, a V-band flange, and a duct body with the inner diameter, wherein the duct body is coupled to the ground connect flange and the V-band flange to have an overall length between 6.261 inches and 8.261 inches and to dispose the V-band flange at an angle between 6.000 degrees and 8.000 degrees relative to the ground connect flange.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
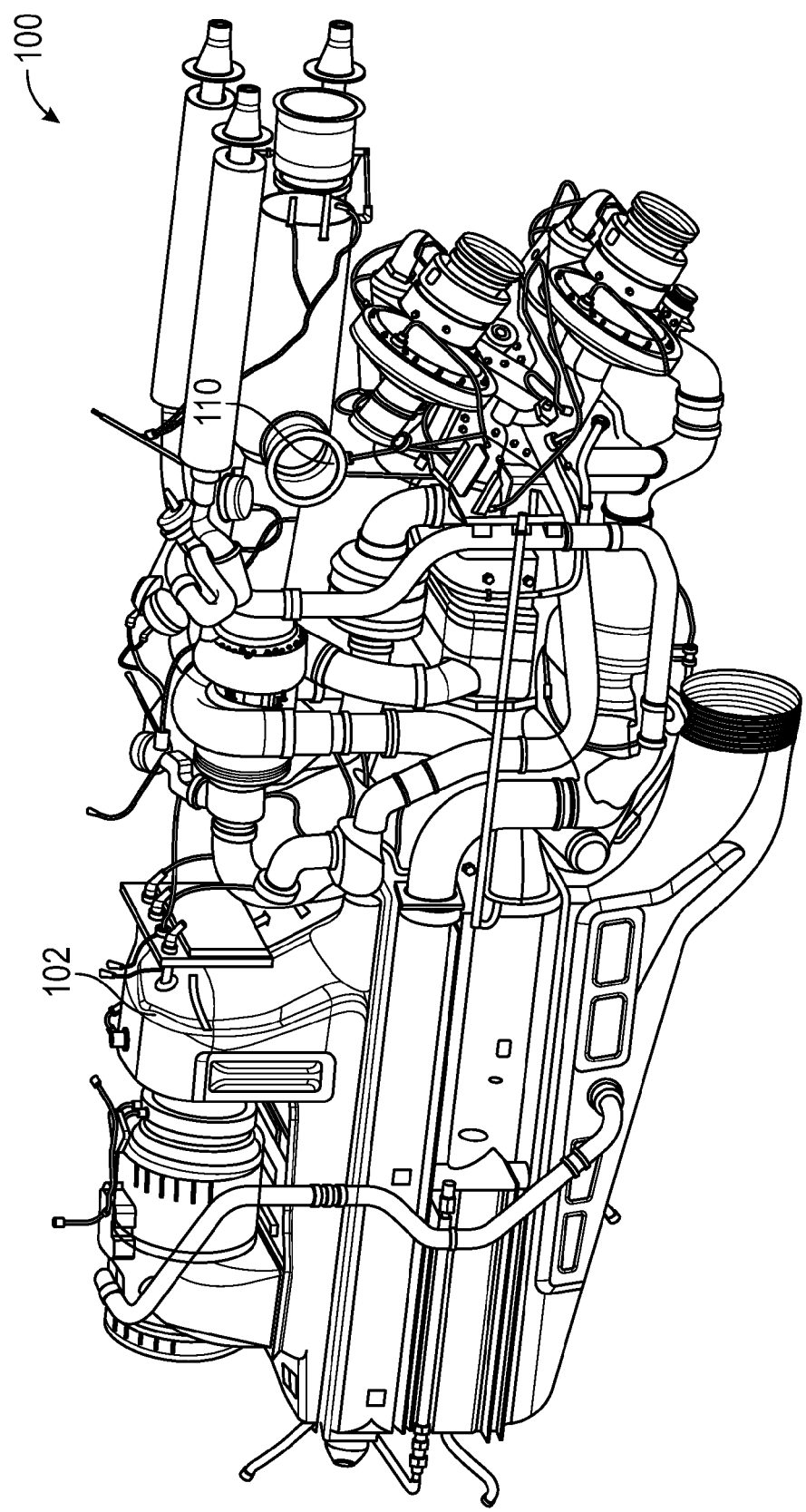
FIG. 1 is an isometric view of one embodiment of an environmental control system.

Referring to the drawings, FIG. 1 shows an environmental control system 100. In the illustrated embodiment, the environmental control system 100 includes an environmental control system module 102 and a ground connect duct 110. In the illustrated embodiment, the environmental control system 100 provides heated and conditioned air to the flight deck and cabin. During aircraft operation, the environmental control system module 102 can provide heated and conditioned air to the flight deck and cabin. However, when the aircraft is on the ground and parked, the environmental control system module 102 may not provide heated and conditioned air. Therefore, in certain embodiments, a ground supply or cart can supply heated or conditioned air flow to the aircraft. In the illustrated embodiment, the ground connect duct 110 can direct heated or conditioned air flow from the ground supply to the environmental control system module 102 to facilitate the airflow from the ground supply into the flight deck and cabin.

Figure 2:
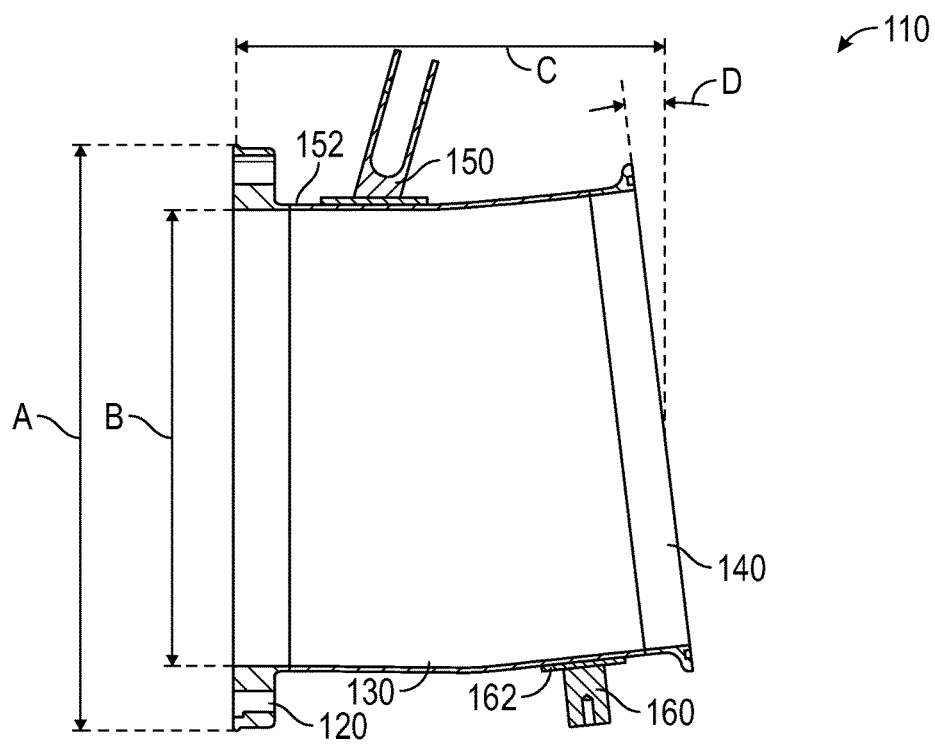
FIG. 2 is a cross sectional view of one embodiment of a ground connect duct for use with the environmental control system of FIG. 1.

Referring to FIG. 2, the ground connect duct 110 is shown. In the illustrated embodiment, the ground connect duct 110 includes a duct body 130, a ground connect flange 120, and a V-band flange 140. In certain embodiments, the ground connect duct 110 further includes a tie rod clevis assembly 150 and a harness boss 160. The ground connect duct 110 can facilitate airflow from a ground source into the environmental control system module 102 by accepting an air hose from a ground source and directing the airflow into the environmental control system module 102. Advantageously, the ground connect duct 110 can accept and provide airflow from a ground source while conforming to the packaging constraints and location of components of the environmental control system 100 in an aircraft. Further, the ground connect duct 110 can minimize total system weight and space required.

Figure 3:
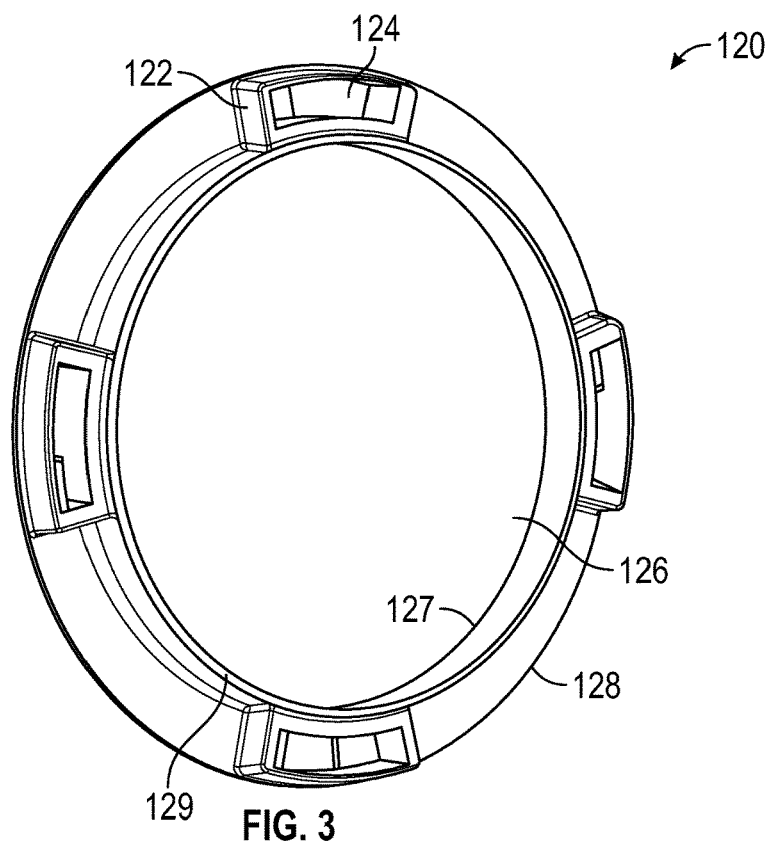
FIG. 3 is an isometric view of one embodiment of a ground connect flange of the ground connect duct of FIG. 2.

Referring to FIGS. 2 and 3, the ground connect flange 120 is shown. In the illustrated embodiment, the ground connect flange 120 includes flange protrusions 122, flange openings 124, an inner diameter 126, an outer diameter 128, a lip inner extent 127 and a lip outer extent 129. In the illustrated embodiment, the ground connect flange 120 can facilitate a connection with a hose or duct from the ground supply to provide heated or conditioned air to the duct body 130. In the illustrated embodiment, the ground connect flange 120 can connect or couple to the duct body 130.

In the illustrated embodiment, the flange protrusions 122 and the flange openings 124 are disposed circumferentially along the ground connect flange 120 between the inner diameter 126 and the outer diameter 128 of the ground connect flange 120. The flange protrusions 122 and the flange openings 124 can be configured to engage and retain a duct or hose from a ground supply of heated or conditioned air. In certain embodiments, the flange protrusions 122 and the flange openings 124 can receive keyed members, toothed members, etc. to locate and then engage the duct or hose. In certain embodiments, the lip outer extent 129 can further provide alignment and a mating surface to engage the external duct or house from the ground supply.

In the illustrated embodiment, the inner diameter 126 facilitates airflow from the ground supply into the duct body 130. In the illustrated embodiment, the outer diameter 128 of the ground connect flange 120 allows for a suitable mating surface. In the illustrated embodiment, the inner diameter 126 is shown as inner diameter B in FIG. 2, and the outer diameter 128 is shown as outer diameter A in FIG. 2. In the illustrated embodiment, the inner diameter B is 8.000 inches, while in other embodiments, the inner diameter B is between 7.000 inches and 9.000 inches. In the illustrated embodiment, the outer diameter A is 10.000 inches, while in other embodiments, the outer diameter A is between 9.000 inches and 11.000 inches.

In the illustrated embodiment, the lip inner extent 127 can mate to the duct body 130 to allow for an uninterrupted flow path. The lip inner extent 127 can be butt welded to the duct body 130. Advantageously, the circumferential butt weld between the lip inner extent 127 and the duct body 130 can allow for the ground connect duct 110 to withstand forces during the connection and removal of the external hose or duct from the ground supply. The ground connect flange 120 can be formed from 301 stainless steel.

Referring to FIG. 2, the duct body 130 is shown. The duct body 130 can direct flow from the ground connect flange 120 to the V-band flange 140. In the illustrated embodiment, the duct body 130 is welded to both the ground connect flange 120 and the V-band flange 140. In the illustrated embodiment, the duct body 130 can have an inner diameter consistent with the inner diameter B shown. The inner diameter of the duct body 130 can be 8.00 inches, while in other embodiments, the inner diameter can be between 7.000 inches and 9.000 inches. In the illustrated embodiment, the duct body can have a wall thickness of 0.063 inches, while in other embodiments, the wall thickness can range from 0.053 inches to 0.073 inches. The duct body 130 can be formed from 301 stainless steel. In the illustrated embodiment, the duct body 130 can be formed at an angle to dispose the V-band flange 140 at an angle relative to the ground connect flange 120. In certain embodiments, the duct body 130 can be miter cut to form the angle, while in other embodiments, the duct body 130 can be bent or otherwise deformed to form the angle D. In the illustrated embodiment, the angle D is 7.000 degrees, while in other embodiments, the relative angle D can be between 6.000 degrees and 8.000 degrees to facilitate the relative location of the environmental control system 100 components and other packaging requirements.

In the illustrated embodiment, the V-band flange 140 connects the ground connect duct 110 to the environmental control system module 102 to direct flow from the ground supply to the flight deck and the cabin. In the illustrated embodiment, the V-band flange 140 can be disposed at angle relative to the ground connect flange 120 to facilitate packaging requirements of the environmental control system. The V-band flange 140 can be coupled to the duct body 130 via welds. In the illustrated embodiment, the V-band flange 140 can be affixed to the environmental control system module 102 via a V-band attached to the V-band flange 140 or a V-band associated with the environmental control system module 102.

Figure 4:
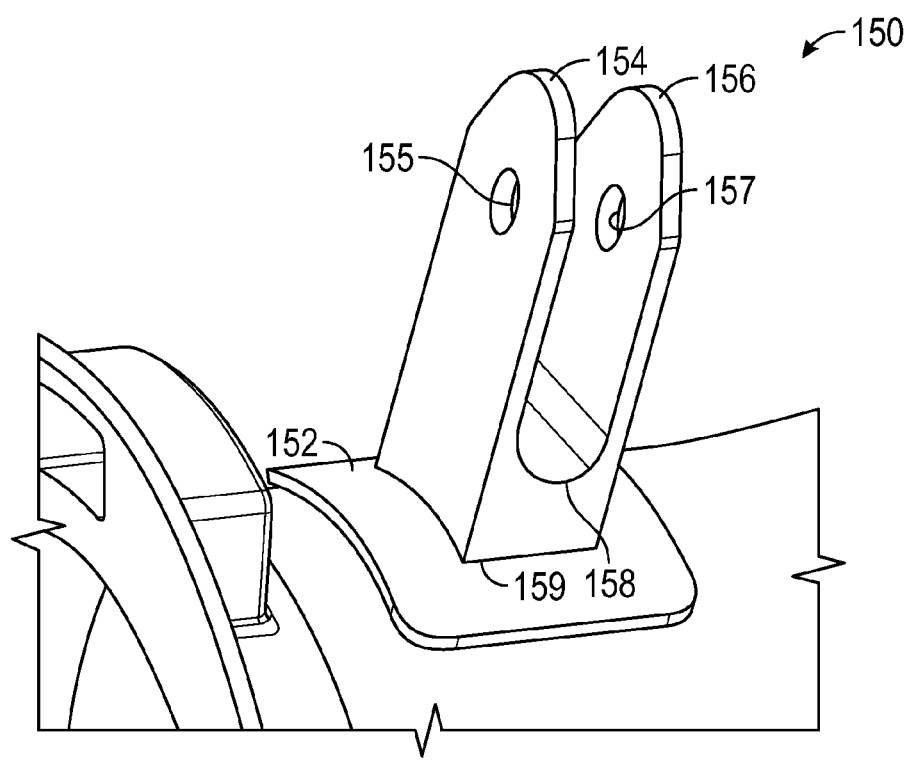
FIG. 4 is an isometric view of one embodiment of a tie rod clevis assembly of the ground connect duct of FIG. 2.

Referring to FIG. 4, the clevis tie rod assembly 150 is shown. In the illustrated embodiment, the clevis tie rod assembly 150 includes prongs 154 and 156, holes 155 and 157, an upper assembly base 158 and a lower assembly base 159. In the illustrated embodiment, the lower assembly base 159 can be welded to the duct body 130 via the clevis tie rod assembly weld 152. In the illustrated embodiment, the prongs 154 and 156 extend from the upper assembly base 158 generally parallel to each other. In the illustrated embodiment, each prong 154 and 156 has a respective through hole 155 and 157. The through holes 155 and 157 may accept a fastener or rod therethrough to secure the duct body 130 to the airframe or the environmental control system module 102. The clevis tie rod assembly 150 prevents rotation of the ground connect duct 110 by connecting the ground connect duct 110 to the airframe of the aircraft or to the environmental control system module 102. Further, clevis tie rod assembly 150 can provide rigidity and orientation for the ground connect duct 110.

Figure 5:
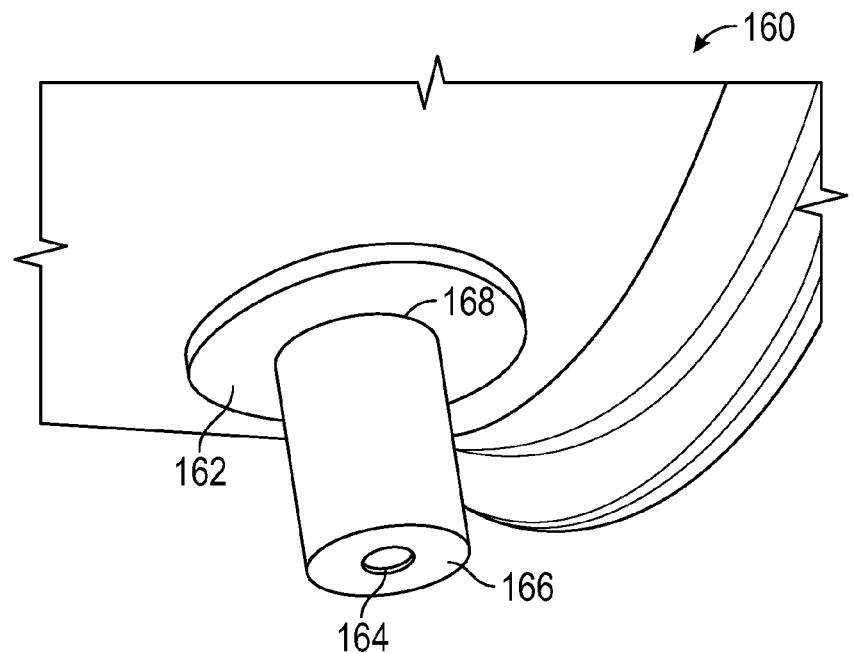
FIG. 5 is an isometric view of one embodiment of a harness boss of the ground connect duct of FIG. 2.

Referring to FIG. 5, the harness boss 160 is shown. In the illustrated embodiment, the harness boss 160 includes a boss through hole 164, a boss face 166, and a boss base 168. In the illustrated embodiment, the harness boss 160 includes a drilled and tapped boss through hole 164 to allow for a locking insert to facilitate the connection of a harness associated with the environmental control system 100. In the illustrated embodiment, the boss base 168 is welded to the duct body 130 via the boss weld 162. In certain embodiments the boss weld 162 can be a fillet weld or any other suitable weld. In the illustrated embodiment, the harness boss 160 is located relative to the clevis tie rod assembly 150.

In the illustrated embodiment, the ground connect duct 110 is assembled by attaching the V-band flange 140 to the duct body 130 and then attaching the ground connect flange 120 to the duct body 130. In certain embodiments, the tie rod clevis assembly 150 is then affixed to the duct body 130 and then the harness boss 160, wherein the position of the harness boss 160 can be referenced from the tie rod clevis assembly 150 location. In the illustrated embodiment, after assembly, the overall length of the ground connect duct 110 along the centerline is shown as length C. In the illustrated embodiment, the overall length C is 7.261 inches, while in other embodiments, the overall length C of the ground connect duct 110 can be between 6.261 inches and 8.261 inches to facilitate the relative location of the environmental control system 100 components and other packaging requirements.

In the illustrated embodiment, the ground connect duct 110 and the components thereof, including the ground connect flange 120, the duct body 130, the V-band flange 140, the tie rod clevis assembly 150 and the harness boss 160 can be formed from 301 stainless steel, or any other suitable material. In the illustrated embodiment, the ground connect duct 110 can withstand operating temperatures exceeding 185 degrees F.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A ground connect duct, comprising:
a ground connect flange with an inner diameter and an outer diameter, wherein the inner diameter is between 7.000 inches and 9.000 inches and the outer diameter is between 9.000 inches and 11.000 inches;
a V-band flange; and
a duct body with the inner diameter,
wherein:
the duct body is coupled to the ground connect flange and the V-band flange to have an overall length between 6.261 inches and 8.261 inches,
the V-band flange is at an angle between 6.000 degrees and 8.000 degrees relative to the ground connect flange, and
the ground connect flange is welded to the duct body.

2. The ground connect duct of claim 1, further comprising:
a tie rod clevis assembly coupled to the duct body.

3. The ground connect duct of claim 2, wherein the tie rod clevis assembly is welded to the duct body.

4. The ground connect duct of claim 1, further comprising:
a harness boss coupled to the duct body.

5. The ground connect duct of claim 4, wherein the harness boss is welded to the duct body.

6. The ground connect duct of claim 1, wherein the ground connect flange includes a plurality of flange openings disposed circumferentially between the inner diameter and the outer diameter.

7. The ground connect duct of claim 1, wherein the ground connect duct is formed of stainless steel.

8. An environmental control system, comprising:
an environmental control system module; and
a ground connect duct to facilitate airflow from a ground source to the environmental control system module, comprising:
a ground connect flange with an inner diameter and an outer diameter, wherein the inner diameter is between 7.000 inches and 9.000 inches and the outer diameter is between 9.000 inches and 11.000 inches;
a V-band flange; and
a duct body with the inner diameter,
wherein:
the duct body is coupled to the ground connect flange and the V-band flange to have an overall length between 6.261 inches and 8.261 inches,
the V-band flange is at an angle between 6.000 degrees and 8.000 degrees relative to the ground connect flange, and
the ground connect flange is welded to the duct body.

9. The environmental control system of claim 8, further comprising:
a tie rod clevis assembly coupled to the duct body.

10. The environmental control system of claim 9, wherein the tie rod clevis assembly is welded to the duct body.

11. The environmental control system of claim 10, further comprising:
a harness boss coupled to the duct body.

12. The environmental control system of claim 11, wherein the harness boss is welded to the duct body.

13. The environmental control system of claim 8, wherein the ground connect flange includes a plurality of flange openings disposed circumferentially between the inner diameter and the outer diameter.

14. The environmental control system of claim 8, wherein the ground connect duct is formed of stainless steel.

15. A ground connect duct, comprising:
a ground connect flange with an inner diameter and an outer diameter, wherein the inner diameter is between 7.000 inches and 9.000 inches and the outer diameter is between 9.000 inches and 11.000 inches;
a V-band flange; and
a duct body with the inner diameter,
wherein:
the duct body is coupled to the ground connect flange and the V-band flange to have an overall length between 6.261 inches and 8.261 inches,
the V-band flange is at an angle between 6.000 degrees and 8.000 degrees relative to the ground connect flange, and
the ground connect duct further comprises a tie rod clevis assembly coupled to the duct body and a harness boss coupled to the duct body.

16. The ground connect duct of claim 15, wherein the tie rod clevis assembly and the harness boss are each welded to the duct body.

17. The ground connect duct of claim 15, wherein:
the duct body comprises a first portion to which the ground connect flange is coupled and a second portion to which the V-band flange is coupled,
the second portion is angled relative to the first portion,
the tie rod clevis assembly is coupled to a first side of the duct body at the first portion, and
the harness boss is coupled to a second side of the duct body, which is opposite the first side, at the second portion.

18. The ground connect duct of claim 17, wherein the tie rod clevis assembly is angled relative to the first portion and the harness boss extends normally away from the second portion.

* * * * *